US007455574B2

(12) United States Patent
Chu et al.

(10) Patent No.: US 7,455,574 B2

(45) Date of Patent: Nov. 25, 2008

(54) LOCKING SYSTEM FOR A SPINDLE OF A POWER TOOL

(75) Inventors: Chiou Long Chu, Miaoli (TW); Jung Kwan Kuo, Miaoli (TW); Yen Shan Fang, Miaoli (TW); Chin-Chiang Chen, Miaoli (TW); Ching-Hsu Wu, Miaoli (TW)

(73) Assignee: Porite Taiwan Co., Ltd., Chunan Miaoli (TW)

( * ) Notice: Subject to any disclaimer, the term of this patent is extended or adjusted under 35 U.S.C. 154(b) by 0 days.

(21) Appl. No.: 11/708,370

(22) Filed: Feb. 20, 2007

(65) Prior Publication Data

US 2008/0087519 A1 Apr. 17, 2008

(30) Foreign Application Priority Data

Oct. 11, 2006 (TW) .............................. 95217921 U

(51) Int. Cl.
*B24B 41/00* (2006.01)
*F16H 57/10* (2006.01)
*B25B 21/00* (2006.01)

(52) U.S. Cl. ..................... 451/342; 451/340; 192/223.2

(58) Field of Classification Search ................. 451/342, 451/340; 192/114 R, 114 T, 28, 223.2, 15, 192/16

See application file for complete search history.

(56) References Cited

U.S. PATENT DOCUMENTS

| | | | | |
|---|---|---|---|---|
| 6,305,481 | B1 * | 10/2001 | Yamazaki et al. | 173/178 |
| 6,311,787 | B1 * | 11/2001 | Berry et al. | 173/176 |
| 6,497,316 | B1 * | 12/2002 | Hsu | 192/223.2 |
| 6,702,090 | B2 * | 3/2004 | Nakamura et al. | 192/223.2 |
| 7,063,201 | B2 * | 6/2006 | Nakamura et al. | 192/223.1 |
| 2002/0130007 | A1 * | 9/2002 | Nakamura et al. | 192/38 |

* cited by examiner

*Primary Examiner*—Joseph J. Hail, III
*Assistant Examiner*—Alvin J. Grant
(74) *Attorney, Agent, or Firm*—Charles E. Baxley

(57) ABSTRACT

A mechanism for locking and cushioning a spindle of a power tool includes a driving disk, a combination of a cam and a plurality of elastic components, and a plurality of roller pairs. The combination of the cam and the elastic components is accommodated in a body. The driving disk is disposed at one end of the body and in contact with the cam. A surface of the driving disk is formed with a plurality of stopping blocks inserted into the body to contact the elastic components, respectively. The roller pairs are respectively disposed between two adjacent stopping blocks and in contact with an inclined surface of an outer surface of the cam. When the power tool is powered off, relative movements between the elastic components and the stopping blocks and pressing forces between the inclined surface of the cam and the roller can cushion and lock the spindle.

3 Claims, 7 Drawing Sheets

LOCKING SYSTEM FOR A SPINDLE OF A POWER TOOL

BACKGROUND OF THE INVENTION

1. Field of the Invention

The invention relates to a locking and cushioning mechanism, and more particularly to a mechanism for locking and cushioning a spindle of a power tool. The mechanism locks and cushions the spindle when the power tool is powered off.

2. Prior Art

A power tool is an automatic tool having a rotatable spindle disposed inside. The spindle is rotated when the power is inputted to the power tool such that the spindle can output a torsional force for use. In addition, the spindle of the power tool may also provide an impact reaction force under a specific condition.

The spindle is driven by the power to rotate at the high speed, and the spindle is still rotated due to the inertia when the power tool is powered off. Thus, the spindle and its peripheral components generate the impact and noise. The way of solving the impact and noise caused by the inertia of the spindle is to dispose a cushioning mechanism or a locking mechanism within the power tool so that the spindle may be automatically locked when the power tool is powered off.

For example, U.S. Pat. Nos. 7,063,201 and 6,702,090 disclose devices of locking spindles. Each device includes a pair of supporting rings, a locking ring, a snap ring, a releasing ring and several rollers. However, the number of the components of the device is great, and the components cannot be easily assembled.

U.S. Pat. No. 6,454,020 also discloses a device of locking a spindle. The device includes a driving disk, a cam, a plurality of brake pads, a combination of springs and balls, and a cover plate. Although the number of the components is smaller than that of the '201 or '090 patents, the assembling of the springs and the balls tends to become inconvenient due to the influence of the rods extending from an end surface of the driving disk because the springs and the balls are disposed between the driving disk and the cover plate.

SUMMARY OF THE INVENTION

It is therefore an object of the invention to provide a mechanism for locking and cushioning a spindle in order to eliminate the drawbacks of the prior art device for locking the spindle, in which the number of components is great, and the assembling processes are complicated.

Thus, the mechanism for locking and cushioning the spindle of the power tool has the reduced number of components and can be easily assembled.

The mechanism for locking and cushioning the spindle according to the invention includes a cam, a driving disk and a plurality of roller pairs. The cam is radially disposed in a plurality of elastic components and accommodated in a body. The driving disk has a plurality of stopping blocks and is disposed at one end of the body. The stopping blocks are inserted into the body to contact the elastic components, respectively. The roller pairs are respectively disposed between two adjacent stopping blocks. When the power tool is powered off, the spindle can be cushioned and locked according to relative movements between the elastic components and the stopping blocks and the pressing forces between restricting portions on the circumference of the cam and the rollers.

The invention will become apparent from the following detailed description of the preferred but non-limiting embodiment. The following description is made with reference to the accompanying drawings.

DETAILED DESCRIPTION OF THE PREFERRED EMBODIMENT OF THE INVENTION

Figure 1:
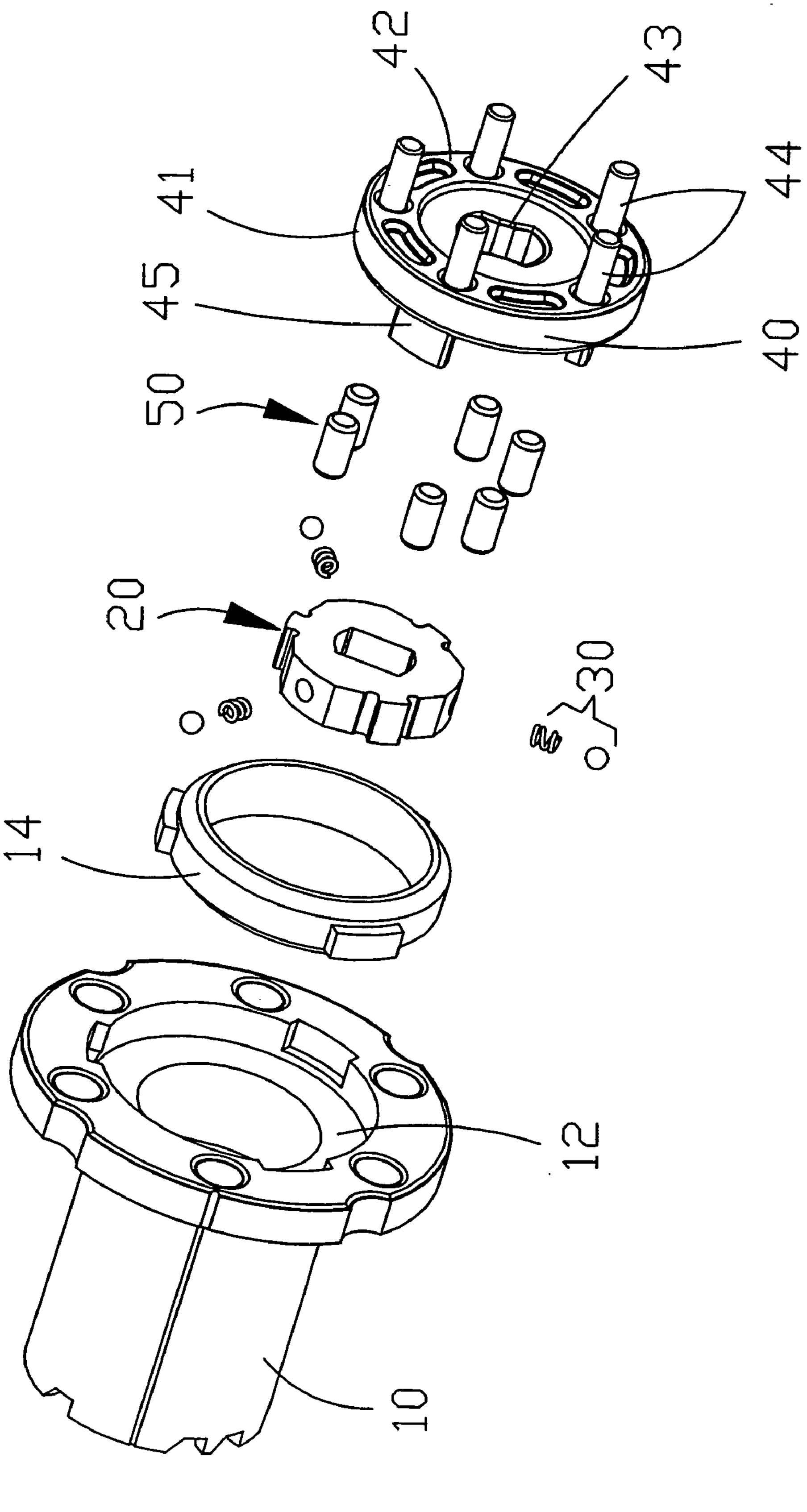
FIG. 1 is an exploded view showing the invention.

As shown in FIG. 1, a cushioning and locking mechanism of the invention is disposed at one end of a body 10. Specifically speaking, the mechanism includes a cam 20, a plurality of elastic components 30, a driving disk 40 and a plurality of roller pairs 50. The one end of the body 10 is formed with a chamber 12 in which a fitting ring 14 is disposed.

Figure 2:
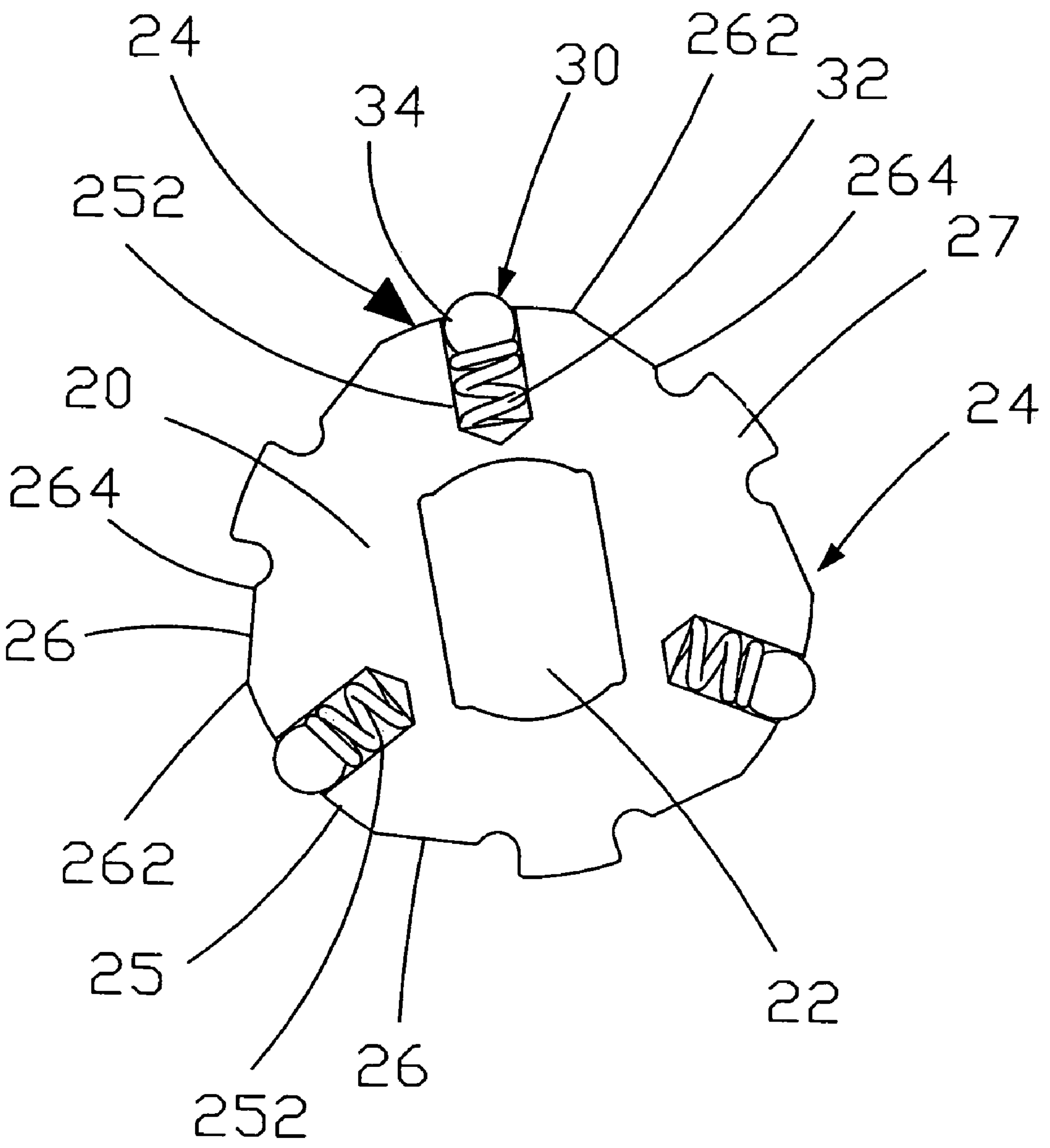
FIG. 2 is a schematic illustration showing a combination of a cam and elastic components according to the invention.

As shown in FIG. 2, the center of the cam 20 is formed with a penetrating shaft hole 22. A plurality of restricting portions 24 is formed on a circumference of the cam 20. Each restricting portion 24 includes a middle surface 25 and a pair of inclined surfaces 26. One end of the middle surface 25 is formed with an arched surface. The inclined surface 26 is a plane. Each inclined surface 26 has a first end 262 and a second end 264. End portions of the first end 262 and the middle surface 25 are connected to each other. The second end 264 is away from the middle surface 25. A projection 27 is disposed between two adjacent restricting portions 24.

In addition, each middle surface 25 is formed with an accommodating hole 252. The accommodating hole 252 extends in a direction toward the radial direction of the cam 20. In addition, one elastic component 30 is disposed in each accommodating hole 252. Each elastic component 30 is composed of a spring 32 and a steel ball 34.

Figure 3:
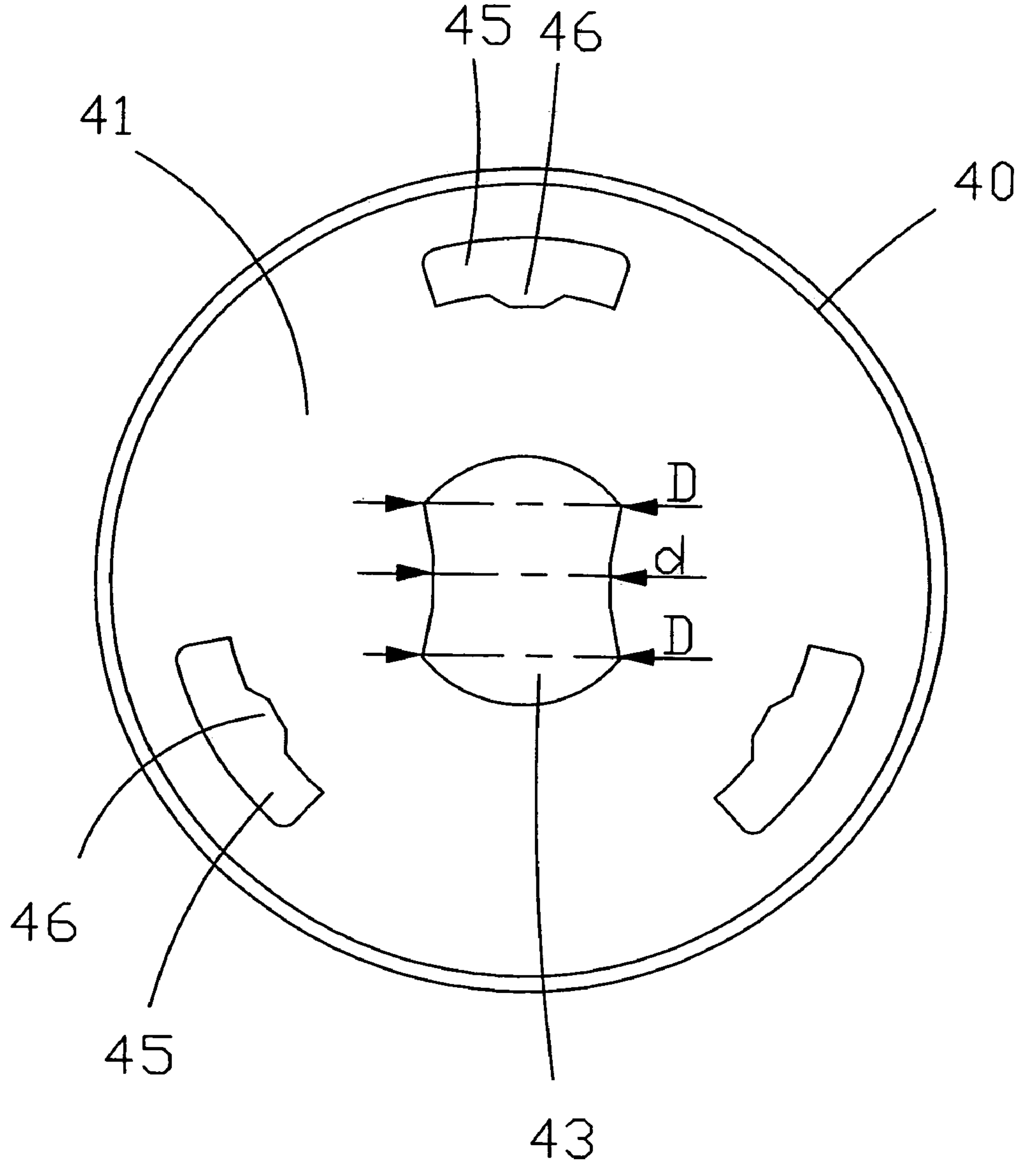
FIG. 3 is a schematic illustration showing a driving disk of the invention.

Referring again to FIG. 1, the driving disk 40 has a first surface 41 and a second surface 42. A shaft passage 43 is formed between the first surface 41 and the second surface 42 and penetrates through the driving disk 40 from the first surface 41 to the second surface 42. A plurality of rods 44 extends from the second surface 42 and is to be connected to gears to be engaged with a power system. As shown in FIG. 3, the width between two ends of the shaft passage 43 is defined as D, the width at the middle position is defined as d, and D>d. The first surface 41 of the driving disk 40 is protrudingly formed with a plurality of stopping blocks 45. A flange 46 is formed at the middle position of the surface of each stopping block 45. In detail, each of the stopping blocks 45 has a middle portion formed with the flange 46 and has two flat surfaces 45A respectively connected to two sides of the flange 46. A corresponding one of the steel balls 34 is in direct contact with a lateral surface 46A of the flange 46 and one of the flat surfaces 45A simultaneously.

Figure 4:
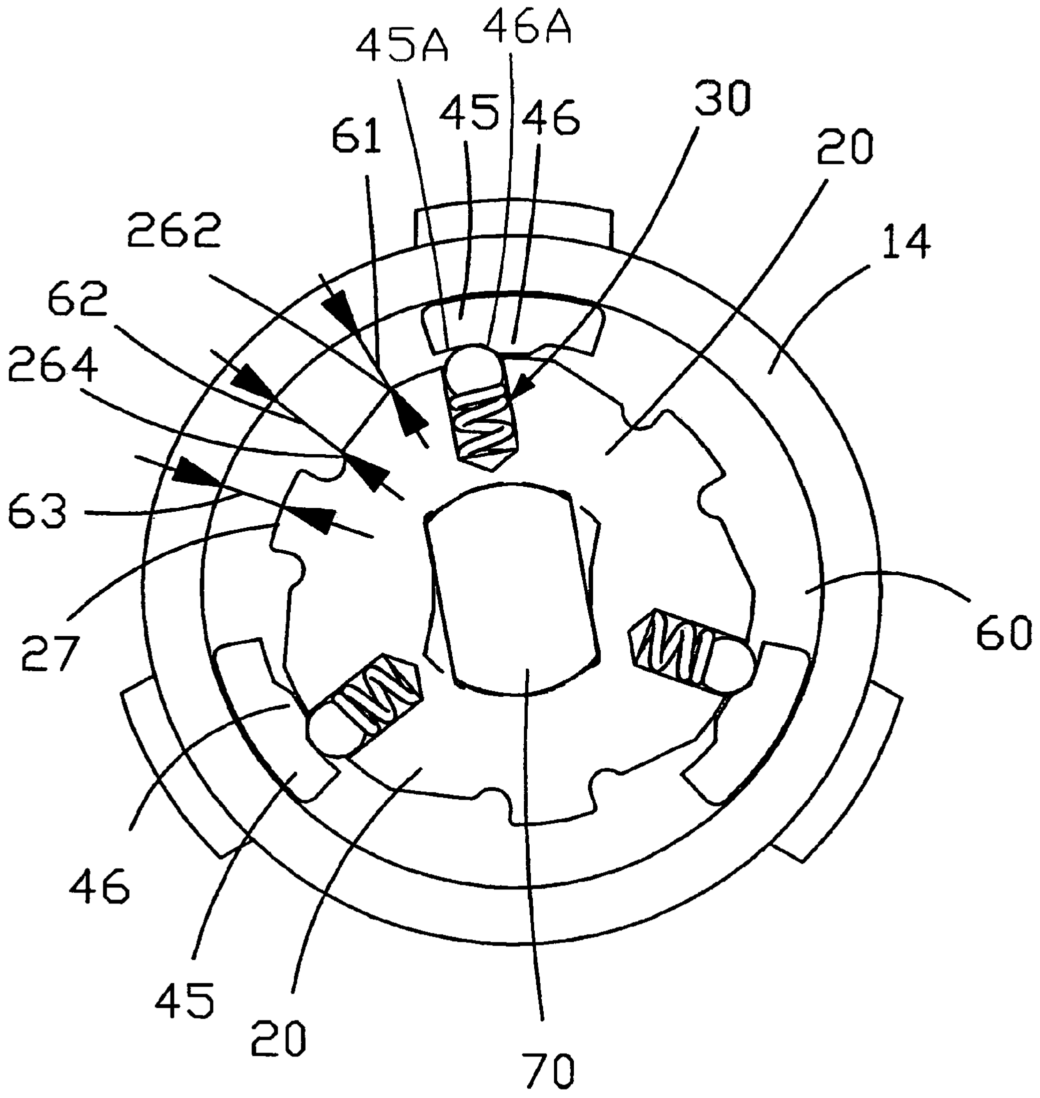
FIG. 4 is a schematic illustration showing a combination of the driving disk and the cam according to the invention.

As shown in FIG. 4, the combination of the cam 20 and the elastic components 30 is disposed in the fitting ring 14 (or the chamber of the body), and an annular space 60 is formed between the outer circumference of the cam 20 and the inner wall surface of the fitting ring 14. A gap between the first end 262 of the inclined surface 26 and the wall surface of the fitting ring 14 is defined as a first gap 61. A gap between the second end 264 and the wall surface of the fitting ring. 14 is defined as a second gap 62. A gap between the projection 27 and the wall surface of the fitting ring 14 is defined as a third gap 63. The second gap 62 is greater than the first gap 61, and the first gap 61 is greater than the third gap 63.

Figure 5:
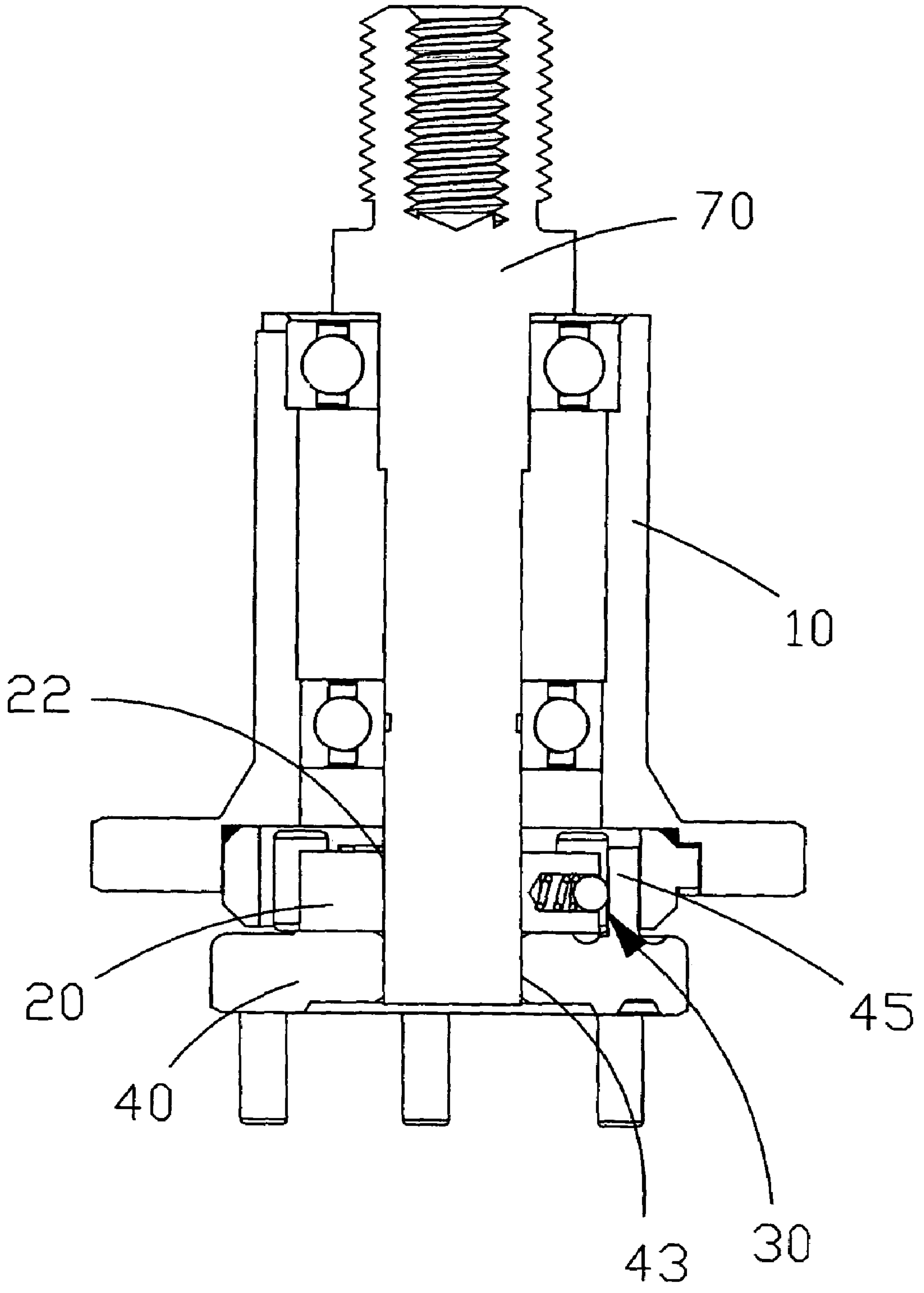
FIG. 5 is a first schematic illustration showing a combination of the mechanism of the invention and the spindle.
Figure 6:
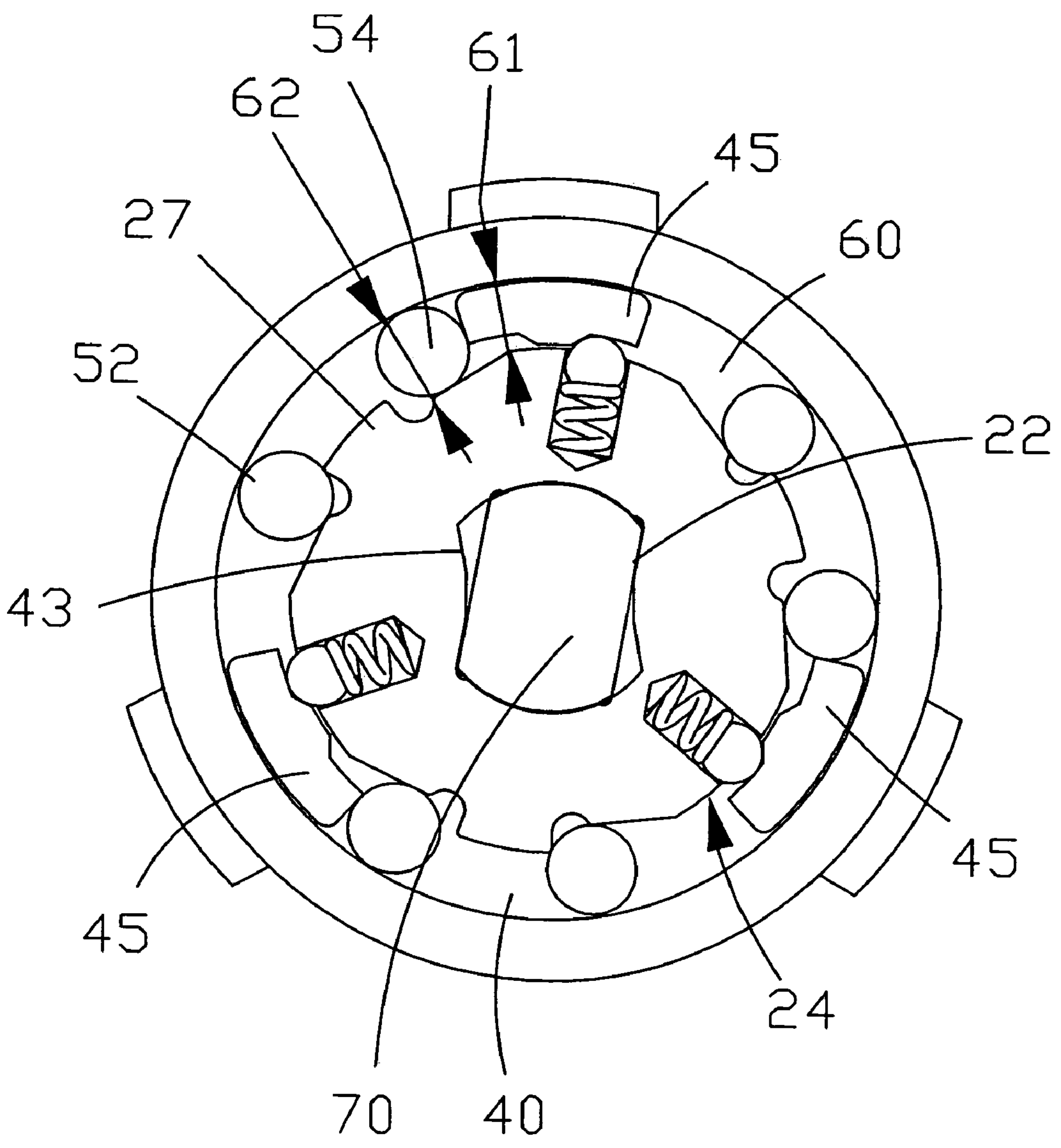
FIG. 6 is a second schematic illustration showing the combination of the mechanism of the invention and the spindle.

As shown in FIGS. 5 and 6, the driving disk 40 is close to the one end of the body 10 to make the stopping blocks 45 be inserted into the annular space 60. Also, each stopping block 45 corresponds to one restricting portion 24 of the cam 20, and the elastic component 30 disposed in the restricting portion 24 projects out to contact the stopping block 45.

The roller pairs 50 are disposed in the annular space 60 and respectively disposed between two adjacent stopping blocks 45. More particularly, two rollers 52 and 54 are respectively disposed at two sides of the projection 27 of the cam 20. Also, the diameter of each of the rollers 52 and 54 is greater than the third gap 63, and is equal to or smaller than the second gap 62. Thus, each of the rollers 52 and 54 is restricted in the range from the first gap 61 to the third gap 63.

One end of a spindle 70 is inserted into the shaft passage 43 of the driving disk 40 and the shaft hole 22 of the cam 20. The other end of the spindle 70 projects beyond the body 10. The outer diameter of the spindle corresponds to the middle width (d) of the shaft hole 22 and the shaft passage 43.

When the power tool is powered on, the power rotates the driving disk 40 through the power system and the gear, which is mounted on one end of the driving disk 40 and engages with the power system. As shown in FIG. 6, the driving disk 40, which is rotated by a small angle in a counterclockwise direction, drives the spindle 70 and the cam 20 to rotate. Because the stopping block 45 blocks the roller 54 from approximating the first gap 61, the rotations of the cam 20 and the spindle 70 will not be limited.

Figure 7:
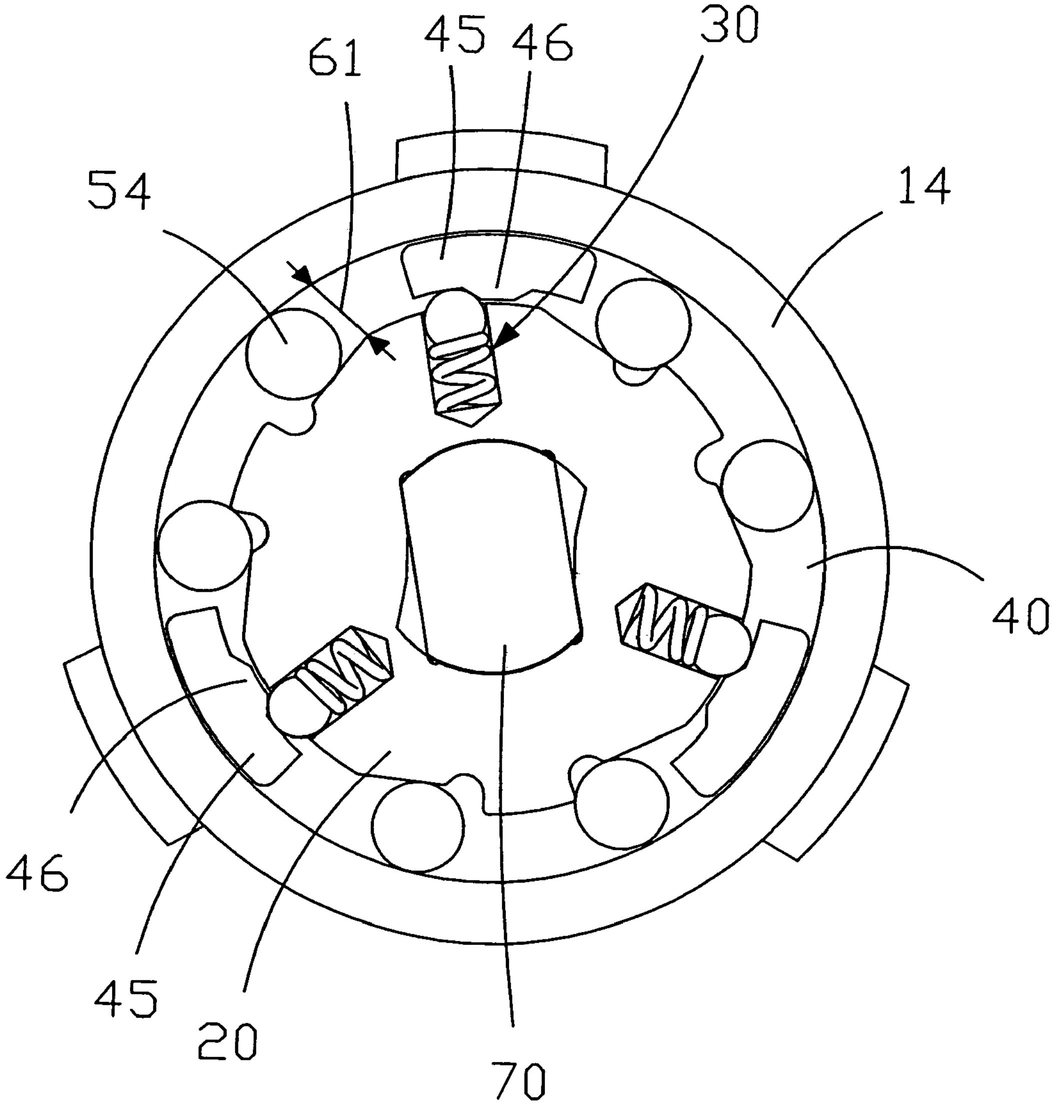
FIG. 7 is a schematic illustration showing a locked state of the spindle according to the invention.

As shown in FIG. 7, the driving disk 40 is stopped when the power is off. At this moment, the spindle 70 and the cam 20 are rotated by a small angle counterclockwise due to the inertia thereof, and the elastic component 30 can cross the flange 46 of the stopping block 45 to make the first gap 61 approximate the roller 54 to provide the cushioning function. Meanwhile, the roller 54 is pressed between the cam 20 and the fitting ring 14 to restrict the cam 20 from rotating so that the spindle 70 can be stopped.

When the power tool operating in a clockwise direction is powered off, relative movements between the inclined surfaces 26 and the rollers 52 can provide the effect of locking the spindle 70.

Thus, the cushioning and locking mechanism according to the invention has the fewer components and can be easily assembled. In addition, the outer circumference of the cam is formed with a plurality of inclined surfaces to press a plurality of rollers such that the cam and the spindle can be stopped. Thus, the mechanism has the simple structure.

While the preferred embodiment of the present invention has been shown and described, it will be apparent to those skilled in the art that various modifications may be made in the embodiment without departing from the spirit of the present invention. Such modifications are all within the scope of the present invention.

What is claim is:

1. A locking system for a spindle when a power tool is powered off, the locking system being disposed in a body and combined with the spindle, said locking system comprising:

a cam having a shaft hole, into which the spindle is inserted;

an annular space formed between an inner wall surface of the body and an outer wall surface of the cam;

a plurality of restricting portions formed on the outer wall surface of the cam, each of the restricting portions comprising a middle surface and two inclined surfaces each having a first end connected to the middle surface, and a second end away from the middle surface, wherein:

a first gap between the first end and the inner wall surface of the body is smaller than a second gap between the second end and the inner wall surface of the body;

a plurality of projections are respectively formed between the two restricting portions, and a third gap between an outer surface of each of the projections and the inner wall surface of the body is smaller than the second gap;

a plurality of elastic components are disposed within the middle surface of each of the restricting portions along a radial direction of the cam, and each of the elastic components comprises a spring and a steel ball facing an inner surface of the body;

a driving disk is disposed at one end of the body and in contact with the cam, the driving disk has a first surface and a second surface, a shaft passage is formed between the first surface and the second surface, the spindle is inserted into the shaft passage, a plurality of stopping blocks is protrudingly formed on the first surface and inserted into the annular space, each of the stopping blocks has a middle portion formed with a flange and has two flat surfaces respectively connected to two sides of the flange, and a corresponding one of the steel balls is in direct contact with a lateral surface of the flange and one of the flat surfaces simultaneously; and a plurality of roller pairs are disposed in the annular space and between the two stopping blocks, and a diameter of each of the rollers is greater than the first gap.

2. The locking system according to claim 1, further comprising a fitting ring disposed between the body and the cam.

3. The locking system according to claim 1, wherein the middle surface of each of the restricting portions of the cam is formed with an accommodating hole along the radial direction of the cam, and the accommodating holes respectively accommodate the elastic components.

* * * * *